(12) United States Patent
Pande et al.

(10) Patent No.: US 11,874,888 B2
(45) Date of Patent: *Jan. 16, 2024

(54) SYSTEMS AND METHODS FOR RECOMMENDING COLLABORATIVE CONTENT

(71) Applicant: Rovi Guides, Inc., San Jose, CA (US)

(72) Inventors: Siddhartha Pande, Bengaluru (IN); Deviprasad Punja, Bangalore (IN); Madhusudhan Srinivasan, Bangalore (IN)

(73) Assignee: ROVI GUIDES, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/509,722

(22) Filed: Oct. 25, 2021

(65) Prior Publication Data

US 2022/0043876 A1 Feb. 10, 2022

Related U.S. Application Data

(63) Continuation of application No. 16/528,535, filed on Jul. 31, 2019, now Pat. No. 11,188,605.

(51) Int. Cl.
*G06F 16/90* (2019.01)
*G06F 16/9536* (2019.01)
(Continued)

(52) U.S. Cl.
CPC ........ *G06F 16/9536* (2019.01); *G06F 16/908* (2019.01); *G06F 16/9535* (2019.01); *G06F 16/9538* (2019.01)

(58) Field of Classification Search
CPC ............. G06F 16/9536; G06F 16/9535; G06F 16/9538; G06F 16/908
See application file for complete search history.

(56) References Cited

U.S. PATENT DOCUMENTS 7,772,480 B2 8/2010 Brennan
8,525,012 B1 9/2013 Yang
(Continued)

OTHER PUBLICATIONS

USPTO Final Office Action for U.S. Appl. No. 16/528,538, dated Aug. 3, 2021 (24 pages).
(Continued)

*Primary Examiner* — Kristopher Andersen
(74) *Attorney, Agent, or Firm* — HALEY GUILIANO LLP

(57) ABSTRACT

The system generates a recommendation of content for use in collaboration, allowing relevant content to be used as base content. The system identifies a content item, and retrieves reviews for the content item from one or more sources or forums. The system filters the reviews to generate a reduced set of reviews based on text of the respective reviews, profile information associated with the reviews, and reference information. A recommendation metric is determined for the content item based on the reduced set of reviews and based on the one or more recommendation criteria. The recommendation criteria specify which aspects of the content impact recommendation, and how those aspects impact recommendation. The recommendation metric indicates whether the content item is recommended as base content, to be used for generating collaborative content. The system generates a recommendation indicator indicative of the recommendation metric, and outputs the indicator for display, storage, or both.

20 Claims, 8 Drawing Sheets

(51) Int. Cl.
    *G06F 16/908*     (2019.01)
    *G06F 16/9535*     (2019.01)
    *G06F 16/9538*     (2019.01)

(56) References Cited

U.S. PATENT DOCUMENTS

| | | | |
|---|---|---|---|
| 9,880,805 | B1 | 1/2018 | Guralnick |
| 2001/0039872 | A1 | 11/2001 | Cliff |
| 2002/0037083 | A1 | 3/2002 | Weare et al. |
| 2002/0199186 | A1 | 12/2002 | Ali et al. |
| 2003/0089218 | A1 | 5/2003 | Gang et al. |
| 2003/0159566 | A1 | 8/2003 | Sater et al. |
| 2004/0107821 | A1 | 6/2004 | Alcalde et al. |
| 2005/0144016 | A1 | 6/2005 | Hewitt et al. |
| 2006/0031402 | A1 | 2/2006 | Saito et al. |
| 2007/0255708 | A1 | 11/2007 | Morita et al. |
| 2008/0091571 | A1 | 4/2008 | Sater et al. |
| 2008/0104061 | A1 | 5/2008 | Rezaei |
| 2008/0195654 | A1 | 8/2008 | Weare |
| 2009/0013002 | A1 | 1/2009 | Eggink et al. |
| 2009/0019995 | A1 | 1/2009 | Miyajima |
| 2009/0049082 | A1 | 2/2009 | Slaney et al. |
| 2009/0064851 | A1 | 3/2009 | Morris et al. |
| 2009/0107320 | A1 | 4/2009 | Willacy et al. |
| 2010/0063952 | A1 | 3/2010 | Sassa et al. |
| 2010/0300264 | A1 | 12/2010 | Foster |
| 2010/0305732 | A1 | 12/2010 | Serletic |
| 2011/0200116 | A1 | 8/2011 | Bloch et al. |
| 2012/0245996 | A1 | 9/2012 | Mendez et al. |
| 2013/0340594 | A1 | 12/2013 | Uemura et al. |
| 2014/0190335 | A1 | 7/2014 | Wieder |
| 2014/0195919 | A1 | 7/2014 | Wieder |
| 2015/0178391 | A1 | 6/2015 | Villaron |
| 2016/0086089 | A1 | 3/2016 | Ritchie et al. |
| 2017/0230438 | A1 | 8/2017 | Turkoglu |
| 2019/0387998 | A1 | 12/2019 | Garten et al. |
| 2021/0034661 | A1 | 2/2021 | Pande et al. |
| 2021/0034688 | A1 | 2/2021 | Pande et al. |
| 2021/0035541 | A1 | 2/2021 | Pande et al. |

OTHER PUBLICATIONS

USPTO Non-Final Office Action for U.S. Appl. No. 16/528,538, dated Feb. 5, 2021 (22 pages).
U.S. Appl. No. 16/528,538, filed Jul. 31, 2019, Siddhartha Pande.

SYSTEMS AND METHODS FOR RECOMMENDING COLLABORATIVE CONTENT

CROSS-REFERENCE TO RELATED APPLICATIONS

This application is a continuation of U.S. patent application Ser. No. 16/528,535, filed Jul. 31, 2019, the contents of which is hereby incorporated by reference herein in its entirety.

BACKGROUND

The present disclosure relates to devices providing content recommendations, and, more particularly, devices that provide recommendations of original content, base content, and collaborative content.

SUMMARY

In a platform that provides collaborative content creation, base content is media content on which multiple collaborations can be built. This base content is created by a user based on some original content. For example, the original content can be a song from soundtrack, movie, show, or album. While the original content may be well known among many users, there may be a significant number of fans or critics who have opinions about how the content could have been better composed or performed. Such opinions may be found in forums such as social media pages and may refer to properties of the content. In the context of a song, the reviews may refer to voice suitability, pitch, notes, lyrics, rhythm, tempo, usage of musical instruments, light effects, climatic settings, or other properties. These critical reviews help the creator of base content create rich and relevant base content variations as compared to the original soundtrack.

The present disclosure describes systems and methods that generate a recommendation as to which original content, and improvements thereto, may be of interest to a base content creator. Reviews from one or more forums, such as social media platforms, are collected and curated into categories. For example, for a song, the categories may include pitch, lyrics, musical instruments, special effects, or other properties, and the corresponding one or more recommendations are made available to the base content creator at the time of base content creation. A content item and a plurality of reviews referring to the content item from one or more databases are retrieved, along with associated metadata. The metadata includes profile information associated with the reviews, the reviewers, or both. The retrieved reviews are filtered based on predetermined categories, text of the reviews as compared to keywords, associated reviewers, ratings of the reviews, popularity of the reviews, or other filter settings. Based on recommendation criteria such as which categories to provide recommendations for, and how to determine recommendations for each category, the system determines a recommendation metric for the content item based on the filtered reviews. The recommendation metric may be outputted directly, for storage, display, or both, or an indicator indicative of the recommendation metric may be outputted. The outputted recommendation provides the base content creator with guidance towards which content is suitable for conversion to base content, and what that conversion should entail.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
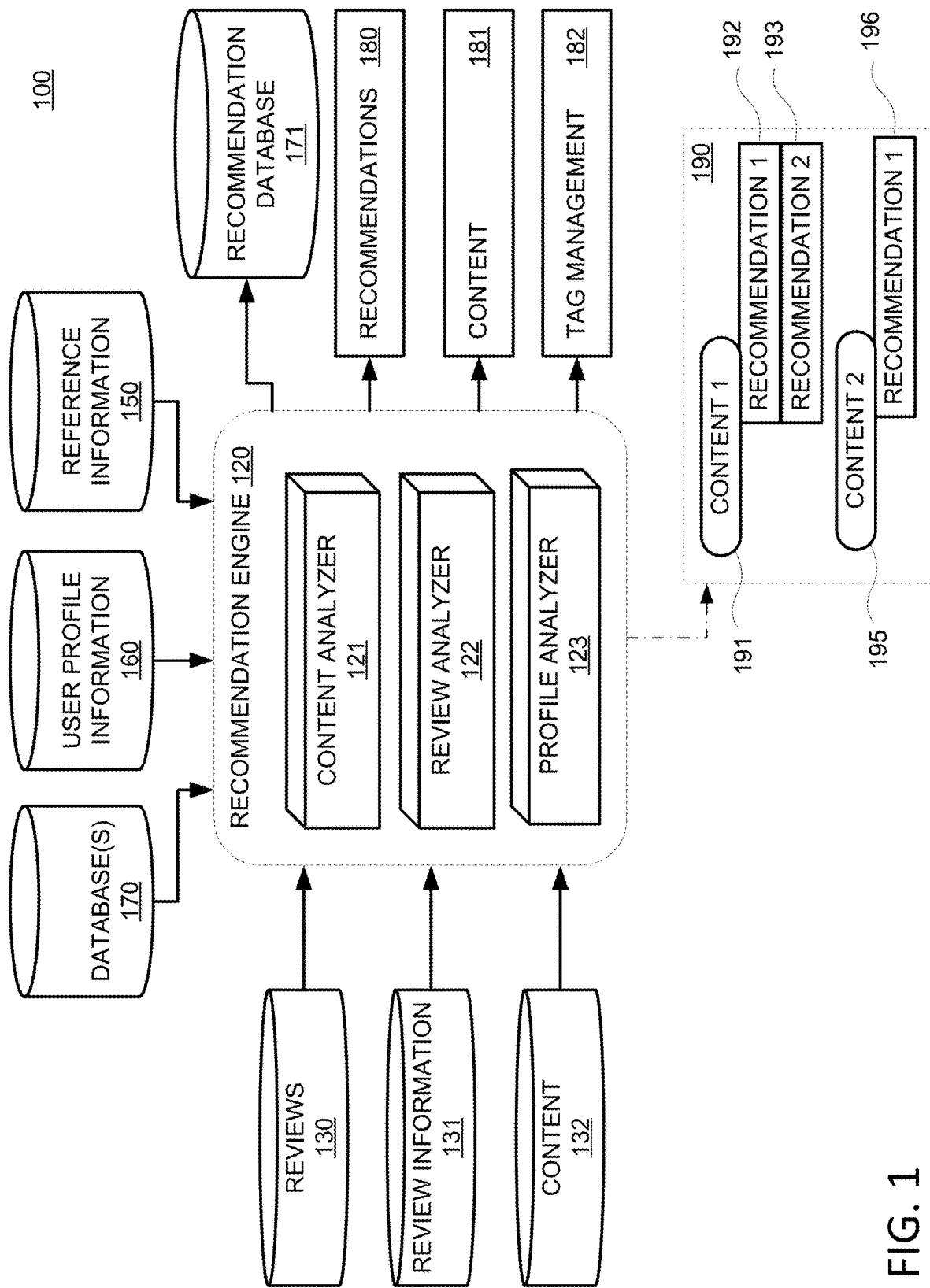
FIG. 1 shows a block diagram of an illustrative system for recommending original content, in accordance with some embodiments of the present disclosure.
Figure 2:
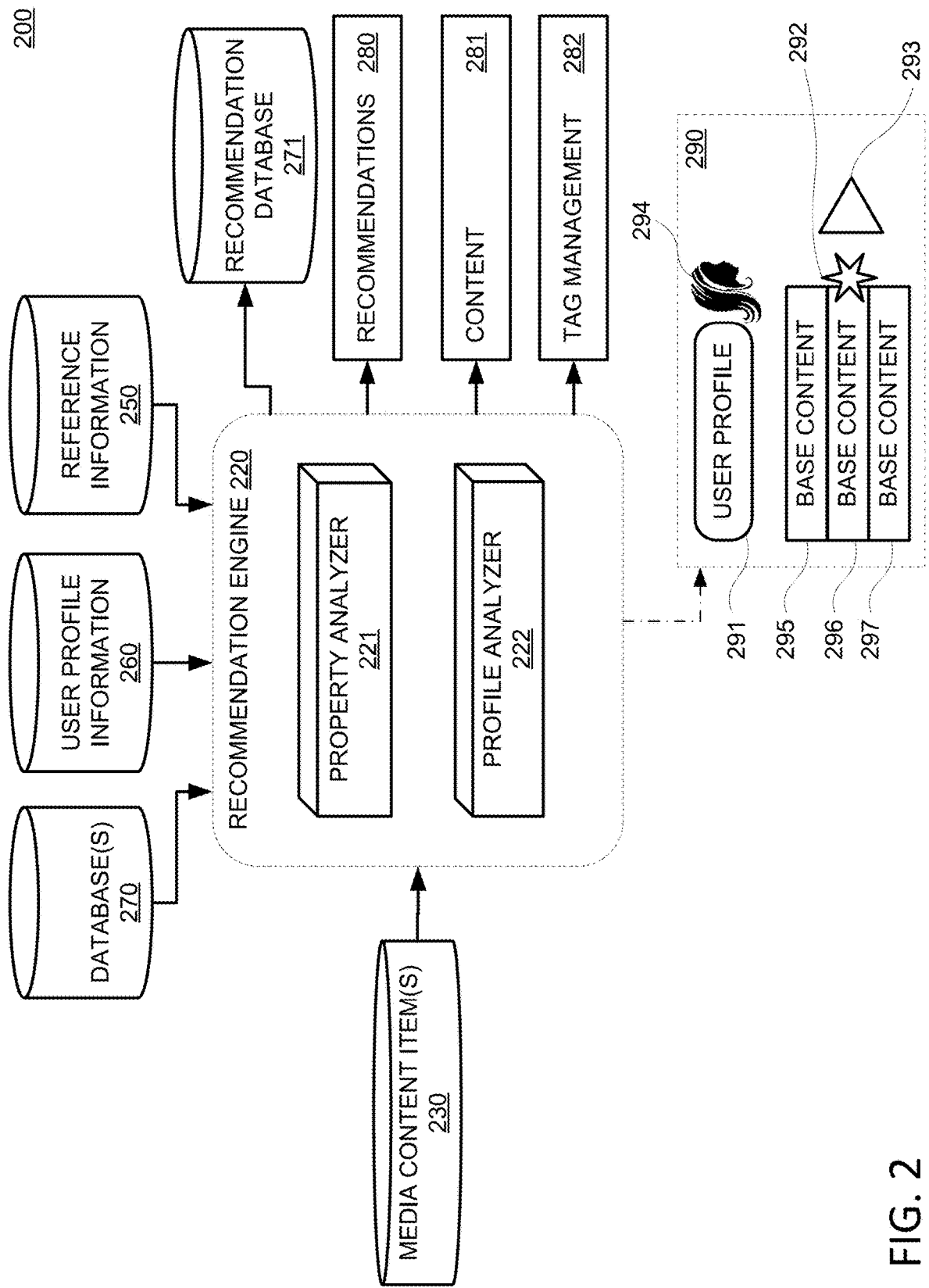
FIG. 2 shows a block diagram of an illustrative system for recommending base content, in accordance with some embodiments of the present disclosure.
Figure 3:
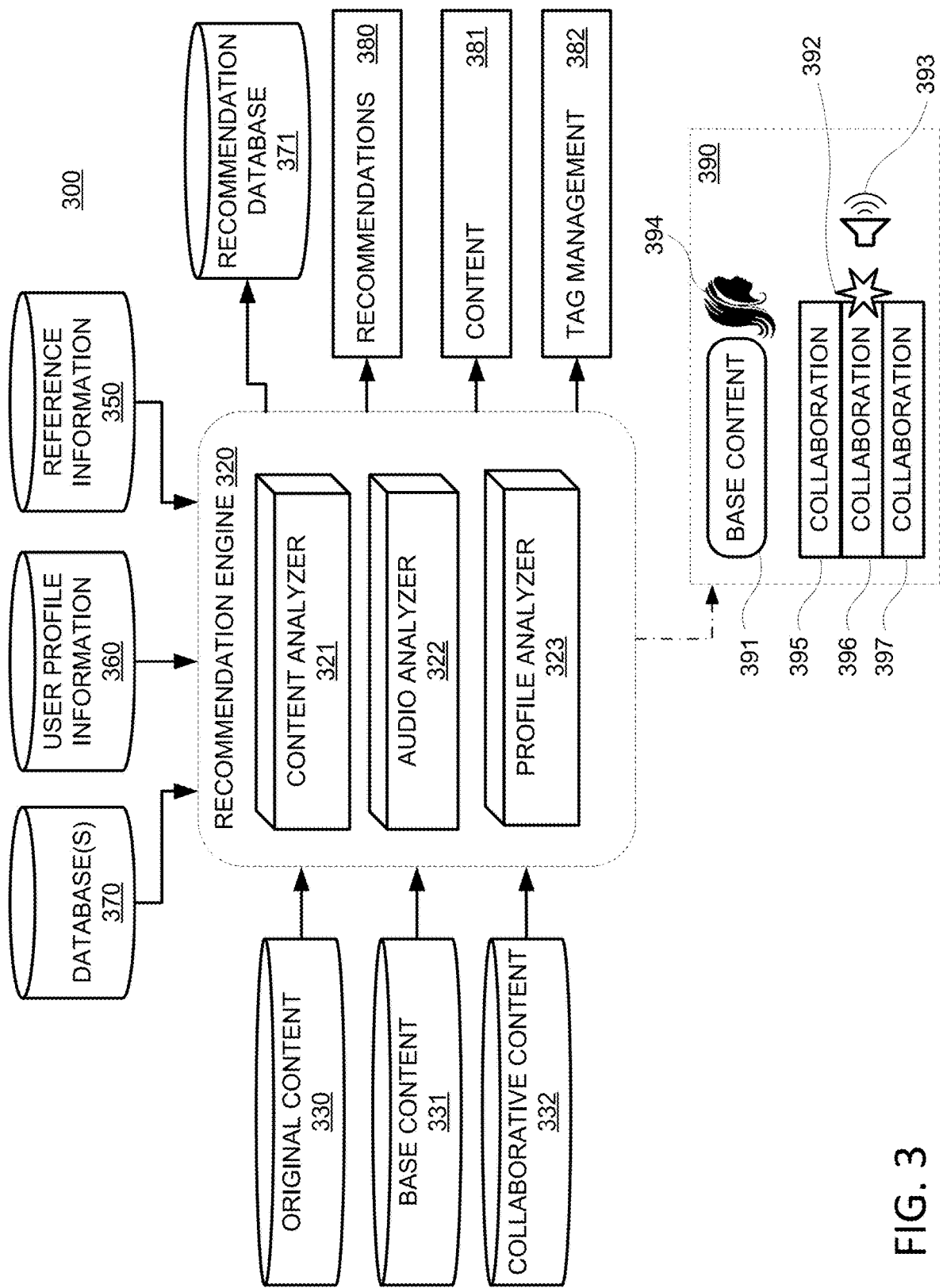
FIG. 3 shows a block diagram of an illustrative system for recommending collaborative content, in accordance with some embodiments of the present disclosure.

Collaborative content may be created by adding layers to existing content. For example, a collaboration may include a karaoke file, in which a user sings over a base track (e.g., which may but need not include vocals). Base content, which is used as a base to generate collaborative content, is derived from original content. The selection of original content (e.g., as a candidate for collaboration), selection of base content (e.g., for collaboration), and selection of collaborative content (e.g., for consumption) may be aided by recommendations. FIGS. 1-3 show illustrative systems for recommending content in the context of collaboration.

FIG. 1 shows a block diagram of illustrative system 100 for recommending original content, in accordance with some embodiments of the present disclosure. System 100 may be configured to, for example, identify original content, and provide recommendations of original content based on reviews, profile information, and properties of the content. In some embodiments, an application that provides collaborative content creation is implemented using system 100. Base content is content upon which multiple collaborative content items may be built. This base content is created by an entity from an original content, which was created as a finished content item (e.g., without regard to collaboration). For example, in the context of music, base content may be laid over original content such as an original soundtrack for a movie, a show, or an album. While the original soundtrack may be popular with the masses, there may exist a significant number of music or content lovers who have opinions about how the soundtrack could have been composed better, or how to collaborate with the content. For example, numerous such reviews may be found in social media referring to voice suitability, pitch, notes, lyrics, rhythm, tempo, usage of musical instruments, usage of light effects, climatic settings, or any other aspect of the original content. These critical reviews could help a creator of base content create a rich and unique base content, possibly with several variations as compared to the original soundtrack. These reviews from various social media platforms or other forums can be collected and curated into categories such as, for example, pitch, lyrics, musical instruments included, special effects, or any other category, and made available to the entity at the time of base content creation. The entity may include, for example, an end user (e.g., and associated profile thereof), a business entity, a social media entity, an entity associated with an application, a website, or a hardware device.

System 100 includes recommendation engine 120, which includes content analyzer 121, review analyzer 122, and profile analyzer 123, as illustrated. Recommendation engine 120 may receive information from one or more databases 170, user profile information 160, reference information 150, any other suitable information, or any combination thereof. Recommendation engine 120 may receive reviews 130, review information 131, content 132 and metadata thereof, or any combination thereof. Recommendation engine 120 may store information in recommendation database 171, provide recommendations 180, provide content 181, perform tag management 182, provide any other suitable output, or perform any combination thereof.

Recommendation engine 120 is configured to retrieve and gather reviews 130 of an original content item from social media websites, social media applications, content-focused applications, or any other suitable forum. Recommendation engine 120 is also configured to analyze these reviews to provide categorized recommendations (e.g., recommendations 180) to a base content creator. For example, recommendation engine 120 may collect reviews 130 from social media applications (e.g., Facebook, Twitter, Instagram and other social media sites) for an original content item, and then filter the reviews based on suitable criteria (e.g., hashtags associated with the content). In a further example, recommendation engine 120 may collect review information 131 from social media applications (e.g., Facebook, Twitter, Instagram and other social media sites) associated with reviews 130. Review information 131 may include metadata, entity identifiers, uniform resource identifiers or locators, profile information associated with a reviewer, comments or feedback directed at a review, any other suitable information about a review or reviewer, or any combination thereof. In some embodiments, reviews 130 and review information 131 may be combined (e.g., stored in data together, linked with each other), and accordingly review information 131 need not be included separately. In some embodiments, recommendation engine 120 identifies reviews that provide suggestions of improvements of original content. For example, recommendation engine 120 may search for keywords such as pitch, voice, better, tempo, names of musical instruments, or other keywords or phrases indicative of a review, opinion, or suggestion. In some embodiments, recommendation engine 120 curates reviews 130 to provide the base content creator with recommendation to create one or more base content items based on the original content.

Recommendations may be categorized by format, genre, one or more content properties, collaborator attributes (e.g., prospective or likely collaborators), reviewer attributes, popularity, changes, or any other suitable category. To illustrate, a recommendation may include whether a content item is recommended, for what the content item is recommended, what changes to the content item are recommended, any other suitable recommendation, or any combination thereof. Recommendations of a category may be based on the number of reviews in the category, the number of users providing reviews relevant to the category, the number of reactions to the reviews on social media, profile information of the reviewer (e.g., review information, user profile information, or both, and relevance thereof), any other suitable information, or any combination thereof. In an illustrative example, each recommendation type for a specific original content item can be weighted by the number of users providing the feedback, a number of likes on the feedback, the relevance of the user or entity giving the feedback, or a combination thereof. For example, for original content that includes an original soundtrack or songs thereof, a review provided by a user who has a music background will have a higher weightage compared to a review from a user not having a music background. Recommendation engine 120 may store one or more recommendations 180 in recommendation database 171, which may include one or more databases. For example, recommendation database 171 may store a curated set of recommendations for each original content item that is based on reviews retrieved and gathered from various social media platforms. In a further example, recommendation engine 120 may retrieve each review and assign a score. The set of recommended changes with the highest score will be presented to the base content creator when they select a given content item. For example, by using reviews from users, a base content creator may provide base content that is relevant for the users, and thus encourages collaboration. In some embodiments, recommendations for one or more recommendation categories correspond to recommended modifications to the original content to generate respective base content. For example, if recommendation engine 120 identifies three categories from the reviews (e.g., pitch, tempo, lighting), recommendation engine 120 may generate three corresponding recommendation indicators. In response, for example, a base content creator may generate three versions of base content from the original content, each including a respective modification (e.g., modified pitch, modified tempo, modified lighting).

User profile information 160 may include profile information associated with a base content creator, reviewer, or any other suitable entity. For example, user profile information 160 may include identifiers (e.g., names, usernames, nicknames, identification numbers), search history (e.g., fired queries), content consumption history (e.g., videos viewed, audio content listened to, content interacted with), any other suitable user information, or any combination thereof. For example, the user information may include current and/or historical user activity information (e.g., what communications the user engages in, what times of day the user consumes content, whether the user interacts with a social network, at what times the user interacts with a social network to post reviews or comments), what types of content the user typically consumes, stored contacts of the user, frequent contacts of the user, any other suitable information, or any combination thereof. In some embodiments, the user information may identify patterns of a given user for a period of more than one year.

Reference information 150 includes any suitable information that may be used as a reference to generate one or more recommendations 180. For example, reference information 150 may include reference keywords and reference templates for determining which reviews are relevant, and for which category of recommendation the review may be applied.

In an illustrative example, recommendation engine 120 may retrieve reviews 130 (e.g., from a social media forum) associated with a plurality of users. Recommendation engine 120 may analyze reviews 130 to identify referenced content items (e.g., using entity recognition, keywords, hashtags, or other identifiers). In some embodiments, all identified content items are analyzed for recommendation. In some embodiments, identified content items having a plurality of associated reviews (e.g., at least a predetermined number of reviews) may be analyzed for recommendation. Recommendation engine 120 may collect reviews of reviews 130 associated with the content item, and identify further content items.

Table 1 shows illustrative recommendation categories, including content properties, popularity (e.g., popularity of content, reviews, or reviewers), and user information (e.g., prospective consumers or base content creators). In some embodiments, content properties may include sub-categories (e.g., such as pitch, tempo, improvement thereof), for which each has an associated recommendation metric. In some embodiments, the recommendation metrics may be combined to generate a single recommendation metric. In some embodiments, popularity may include sub-categories (e.g., such as content popularity, review popularity, reviewer popularity), for which each has an associated recommendation metric. For example, a content item may be trending among social media platforms, and an associated popularity-based recommendation metric may accordingly be stronger. In a further example, a reviewer may be highly viewed and rated, and an associated popularity-based recommendation metric may be stronger. In some embodiments, user information may include sub-categories (e.g., such as user preferences, favorite attributes, genre), for which each has an associated recommendation metric. For example, recommendation engine 120 may specify categories for country songs or slow songs, and recommend content items that fit those descriptions more strongly to a base content creator whose associated profile information indicates those preferences.

TABLE 1

Categories of recommendation

| Category | Keywords/Categories | Template |
|---|---|---|
| Content properties | {pitch;tempo;voice;better; {instruments};range;notes; lyrics;effects;rhythm; harmony;settings} | Identify keywords → Categorize |
| Popularity | {trending, viral, most, likes} | Identify keywords → Determine statistics → Categorize |
| User Information | {{preferences};{favorites}; {genre}} | Identify keywords → Categorize |

Panel 190 shows an illustrative display of identifiers for content items 191 and 195, and associated recommendation indicators 192, 193, and 196. Recommendation indicators 192 and 193 correspond to recommendations in two recommendation categories (e.g., pitch and popularity, or highly rated and compatible genres) for content item 191. Recommendation indicator 196 corresponds to a single recommendation for content item 191. Recommendation indicator 196 may be derived from a single recommendation category, or be a composite recommendation based on a plurality of recommendation categories. A base content creator may view the display of panel 190 and select the content item having the most relevant or preferred recommendations.

FIG. 2 shows a block diagram of illustrative system 200 for recommending base content, in accordance with some embodiments of the present disclosure. Users may access a variety of platforms to interact with content, and within a given platform the intentions of a user can be varied at different times. The content may include video content, audio content, image content, any other suitable content, or any combination thereof. In some embodiments, system 200 provides varied recommendations to the same user. For example, if the user wants to sing along to a song (e.g., as karaoke), system 200 presents content to that user that includes music they can easily or effectively sing, which may differ from music the user usually listens to. In some embodiments, system 200 determines how the user is planning to use the platform and provides suitable recommendations of content. In an illustrative example, a user may enjoy listening to a high pitched song but does not desire to sing along or attempt to collaborate on that song. In a further illustrative example, a user may desire to dance along to a break-dancing video, and be capable of such moves, although the user does not usually watch breakdancing videos. System 200 provides recommendations of content that is appropriate for the user's performance in terms of skill, preference, and suitability.

System 200 includes recommendation engine 220, which includes property analyzer 221 and profile analyzer 222, as illustrated. Recommendation engine 220 may receive information from one or more databases 270, user profile information 260, reference information 250, any other suitable information, or any combination thereof. Recommendation engine 220 may retrieve one or more media content items 230, which may include base content. Recommendation engine 220 may store information in recommendation database 271, provide recommendations 280, provide content 281, perform tag management 282, provide any other suitable output, or perform any combination thereof.

Recommendation engine 220 may determine parameters such as how the user entered the system (e.g., a login, immediately previous viewings, or links). For example, recommendation engine 220 may determine that if a user accesses an application using a shortcut on a user device, then the user has an intention to perform (e.g., sing, dance, move, draw). In a further example, recommendation engine 220 may determine that if the user accesses the application using a shared link or notification on a social media, then the intention may be based on properties of the link. For example, if the link is to join someone else to sing, the intention is to sing. In a further example, if the link is to listen to a song (e.g., media content item 230), then the intention is to listen (e.g., and not sing). Recommendation engine 220 may respond to a user input based on the input itself. For example, recommendation engine 220 may determine that a content item is to be consumed as a default determination (e.g., if no microphone is connected to a user device). In a further example, recommendation engine 220 may determine that the content is to be played, and a user's performance is to be recorded (e.g., which may be collaborative content) based on user location (e.g., the user is in a location usually used to record such as a home studio environment), based on a connected device (e.g., a set of headphones), or based on other suitable criteria. In some embodiments, recommendation engine 220 uses these parameters to determine which content to recommend for consumption, collaboration, performance, or a combination thereof.

In an illustrative example, if recommendation engine 220 determines that the intention is to perform, then recommendation engine 220 may identify one or more types of songs that the user can sing well or otherwise likes to sing (e.g., based on user profile information 260). For example, recommendation engine 220 may identify songs by pitch (e.g., low or high), speed (e.g., fast tempo, slow tempo), ratings (e.g., stored in user profile information 260 from previous performances), invites (e.g., from other users, that may specify a media content item), consumption history (e.g., known or previously consumed songs from one or more platforms, as stored in user profile information 260), any other suitable criteria, or any combination thereof. In some embodiments, recommendation engine 220 uses analysis of the user's capabilities to match them with media content items 230 (e.g., which may be stored in one or more databases 270) that have similar or suitable characteristics.

In a further illustrative example, recommendation engine 220 may determine that the intention is to consume but not perform (e.g., listen, watch, or both) based on consumption history or preferences (e.g., of user profile information 260). In some embodiments, recommendation engine 220 recommends a media content item or otherwise bases a recommendation on a rating of the content across one or more platforms. For example, a media content item having a highest rating (e.g., 5 out of 5 stars) may be more strongly recommended by recommendation engine 220.

Property analyzer 221 is configured to analyze media content, performances, and properties thereof to be used for making recommendations. For example, in the context of a karaoke-based musical composition, content analyzer 221 may determine how well the content matches reference criteria (e.g., of user profile information 260) such as the user's ability to match pitch, tempo, harmony, volume, or other audio property. In a further example, comparisons against the reference criteria may be considered to be metrics for good audio quality or an otherwise well-formed performance. In some embodiments, content analyzer 221 analyzes the media content item in the time domain, spectral domain, any other suitable domain, or any combination thereof to determine properties. In some embodiments, content analyzer 221 uses reference information 250 to compare against properties, or metrics determined thereof, of the media content item. For example, templates for any suitable property may be stored in reference information 250, and retrieved for comparison by recommendation engine 220.

Profile analyzer 222 is configured to compare user profile information 260 to properties of media content item 230, or associated metadata tags thereof. For example, user profile information 260 may include consumption history (e.g., which content the user has watched or listened to), performance history (e.g., which content the user has interacted with, what performance components the user has achieved, and associated statistical information), ability-focused tags (e.g., achievable pitches, achievable moves), any other information about the user and their behavior, or any combination thereof.

In an illustrative example, a user may access a recommendation application (e.g., recommendation engine 220) on a smartphone. The user may indicate an intention to perform karaoke by selecting a soft button displayed by the recommendation application. In response, the recommendation application may identify a song that has associated tags that match tags of profile information associated with the user. If the profile information indicates that the user prefers rock and roll songs, recommendation engine 220 may recommend a rock and roll song that includes a pitch range and tempo that match the user's capabilities (e.g., as indicated in user profile information 260).

Panel 290 shows an illustrative display of identifiers for a user's profile 291, and base content items 295, 296, and 297. Recommendation indicator 292 is displayed associated with base content 296, which is most highly recommended. Icon 293 includes a link to play, display, or otherwise provide base content 296 for consumption or collaboration. Identifier 294 corresponds to the user, and may be associated with user profile information 260 associated with the user.

FIG. 3 shows a block diagram of illustrative system 300 for recommending collaborative content, in accordance with some embodiments of the present disclosure. System 300 may be configured to, for example, identify collaborative content, and provide recommendations of collaborative content based on properties of the content, comparative properties of the content relative to reference content, user profile information (e.g., of the base content creator or collaborator), compatibility of content creators, a format of the content, popularity information (e.g., of the collaboration, associated base content or associated original content), any other suitable considerations, or any combination thereof. In some embodiments, an application that provides collaborative content creation is implemented using system 300. Collaborative content, or a "collaboration," may be created by adding additional content to base content. The additional content may be overlaid, blended, or otherwise combined with the base content. For example, multiple users can each create a replica of a base content item, which is created by a user (e.g., a base content creator). In a further example, the creator of the base content can review the combined content where other users have collaborated with that base content. In some instances, the base content is viral or trending, and the base content creator of this content will have hundreds of users interact with the base content, follow a social media feed, provide comments and reviews, or otherwise interact the base content and creator. In a further example, viewers or other users who want to interact with or consume content may create a large number of collaborations to choose from. Because parsing and selecting among the large number of content items may be arduous, and increasingly time consuming as the number of users grows, system 300 provides recommendations for collaborations. To illustrate, if hundreds of users joined a collaboration, each collaborating in some way, the resulting collaborative content would likely be too numerous for a user to navigate by themselves (e.g., the user might not have time to consume and compare that number of content items). System 300 provides means to recommend top collaborations with the base content (e.g., for the creator to review and consume, or for other users).

System 300 includes recommendation engine 320, which includes content analyzer 321, audio analyzer 322, and profile analyzer 323, as illustrated. Recommendation engine 320 may receive information from one or more databases 370, user profile information 360, reference information 350, any other suitable information, or any combination thereof. Recommendation engine 320 may retrieve original content 330, base content 331, collaborative content 332, information associated with content, or a combination thereof. Recommendation engine 320 may store information in recommendation database 371, provide recommendations 380, provide content 381, perform tag management 382, provide any other suitable output, or perform any combination thereof.

Content analyzer 321 is configured to analyze collaborative content and properties thereof to be used for making recommendations. For example, in the context of a karaoke collaboration, content analyzer 321 may determine how well the content matches reference criteria (e.g., of reference information 350) such as pitch, tempo, harmony, volume, or any other audio property. In a further example, comparisons against the reference criteria may be considered to be metrics for good audio quality or an otherwise well-formed collaboration. Content analyzer 321 may analyze the media content item in the time domain to determine temporal information (e.g., phasing, pauses, lengths), spectral domain to determine frequency information (e.g., to determine a note, phases, frequency), any other suitable domain (e.g., using a wavelet transform or other time-frequency transform), or any combination thereof. In some embodiments, content analyzer 321 uses reference information 350 to compare against properties, or metrics determined thereof, of the media content item. For example, templates for any suitable property may be stored in reference information 350 and retrieved for comparison by recommendation engine 320.

In some embodiments, recommendation engine 320 bases its recommendation on a perfection metric of the collaboration content (e.g., properties of the collaborative content compared against a reference). For example, recommendation engine 320 may determine if the created collaboration matches some or all aspects of pitch and tempo of the base content. In some embodiments, recommendation engine 320 bases its recommendation on a compatibility of content creators (e.g., the base content creator and the collaborator). In some embodiments, recommendation engine 320 bases its recommendation on property comparisons (e.g., pitch, harmony, or other property) such that the overall content together is better to consume. In some embodiments, recommendation engine 320 bases its recommendation on ratings of the collaborator, and optionally ratings of the base content creator. For example, if the base content is associated with an average rating with average performance indicators (e.g., conformance to pitch and rhythm), recommendation engine 320 may recommend collaborative content having creators with similar ratings (e.g., with more highly rated singers being more strongly recommended). In some embodiments, recommendation engine 320 bases its recommendation on the format of the base content and collaborative content. For example, if the base content was created as a video, preference (e.g., a stronger recommendation) is given to collaborative content including video. A recommendation may be based on metrics and parameters derived using audio, video, image, spectral, temporal, or other analysis of base content, collaborative content, original content, or a combination thereof as inputs, with the analysis results stored in a suitable database for further analysis.

Panel 390 shows an illustrative display of identifiers for base content 391, and collaborations 395, 396, and 397. Recommendation indicator 392 is displayed associated with collaboration 396, which is most highly recommended. Icon 393 includes a link to play, display, or otherwise provide collaboration 396 for consumption. Identifier 394 corresponds to the creator of base content 391, and may be associated with user profile information 360 for a creator of base content 391.

In some embodiments, a recommendation application or collaboration application may include the functionality of any or all of recommendation engines 120, 220, and 320 of FIGS. 1-3. For example, an application may be configured to provide recommendations to base content creators, collaborators, and other users for whom content may be of interest. It will be understood that components or functionality of recommendation engines 120, 220, and 320 of FIGS. 1-3 may be combined, omitted, appended, or otherwise modified in accordance with the present disclosure.

A user may access content, an application (e.g., for providing recommendations, content, or both), and other features from one or more of their devices (i.e., user equipment or audio equipment), one or more network-connected devices, one or more electronic devices having a display, or a combination thereof, for example. Any of the illustrative techniques of the present disclosure may be implemented by a user device, a device providing a display to a user, or any other suitable control circuitry configured to respond to a voice query and generate a display of content to a user.

Figure 4:
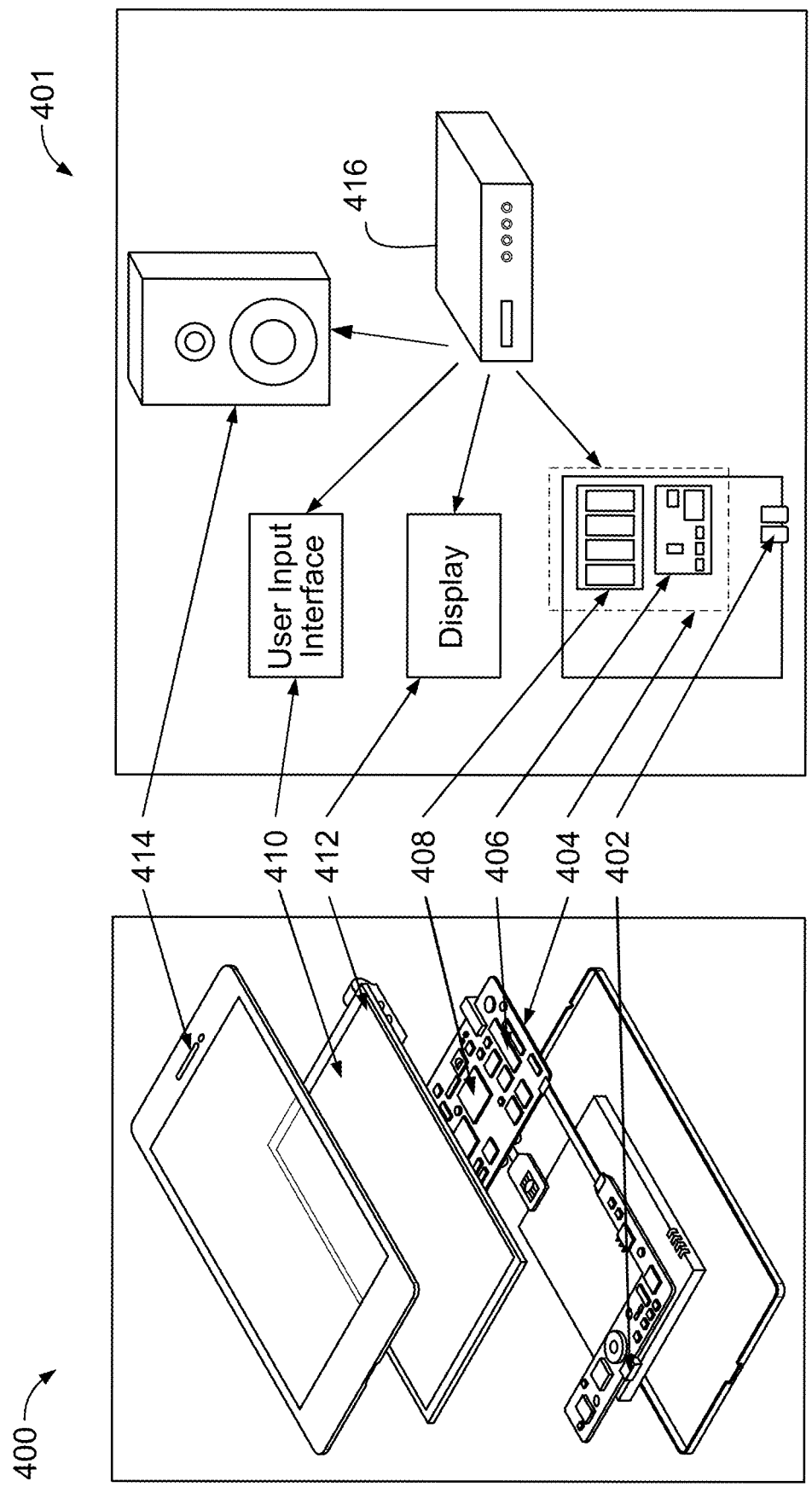
FIG. 4 is a block diagram of an illustrative user equipment, in accordance with some embodiments of the present disclosure.

FIG. 4 shows generalized embodiments of an illustrative user device. User equipment system 401 may include set-top box 416 that includes, or is communicatively coupled to, display 412, audio equipment 414, and user input interface 410. In some embodiments, display 412 may include a television display or a computer display. In some embodiments, user input interface 410 is a remote-control device. Set-top box 416 may include one or more circuit boards. In some embodiments, the one or more circuit boards include processing circuitry, control circuitry, and storage (e.g., RAM, ROM, hard disk, removable disk, etc.). In some embodiments, circuit boards include an input/output path. Each one of user device 400 and user equipment system 401 may receive content and data via input/output (hereinafter "I/O") path 402. I/O path 402 may provide content and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths but are shown as a single path in FIG. 4 to avoid overcomplicating the drawing. While set-top box 416 is shown in FIG. 4 for illustration, any suitable computing device having processing circuitry, control circuitry, and storage may be used in accordance with the present disclosure. For example, set-top box 416 may be replaced by, or complemented by, a personal computer (e.g., a notebook, a laptop, a desktop), a network-based server hosting a user-accessible client device, a non-user-owned device, any other suitable device, or any combination thereof.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry is distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for an application stored in memory (e.g., storage 408). Specifically, control circuitry 404 may be instructed by the application to perform the functions discussed above and below. For example, the application may provide instructions to control circuitry 404 to generate media guidance displays, collaboration application displays, or other suitable displays. In some implementations, any action performed by control circuitry 404 may be based on instructions received from the application.

In some client/server-based embodiments, control circuitry 404 includes communications circuitry suitable for communicating with an application server or other networks or servers. The instructions for carrying out the above-mentioned functionality may be stored on the application server. Communications circuitry may include a cable modem, an integrated-services digital network (ISDN) modem, a digital subscriber line (DSL) modem, a telephone modem, an ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other (described in more detail below).

Memory may be an electronic storage device such as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, solid state devices, quantum storage devices, gaming consoles, gaming media, any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, for example, may be used to supplement storage 408 or instead of storage 408.

A user may send instructions to control circuitry 404 using user input interface 410. User input interface 410, display 412, or both may include a touchscreen configured to provide a display and receive haptic input. For example, the touchscreen may be configured to receive haptic input from a finger, a stylus, or both. In some embodiments, user device 400 may include a front-facing screen and a rear-facing screen, multiple front screens, or multiple angled screens. In some embodiments, user input interface 410 includes a remote-control device having one or more microphones, buttons, keypads, any other components configured to receive user input, or combinations thereof. For example, user input interface 410 may include a handheld remote-control device having an alphanumeric keypad and option buttons. In a further example, user input interface 410 may include a handheld remote-control device having a microphone and control circuitry configured to receive and identify voice commands and transmit information to set-top box 416.

Audio equipment 414 may be provided as integrated with other elements of each one of user device 400 and user equipment system 401 or may be stand-alone units. The audio component of videos and other content displayed on display 412 may be played through speakers of audio equipment 414. In some embodiments, the audio may be distributed to a receiver (not shown), which processes and outputs the audio via speakers of audio equipment 414. In some embodiments, for example, control circuitry 404 is configured to provide audio cues to a user, or other audio feedback to a user, using speakers of audio equipment 414. Audio equipment 414 may include a microphone configured to receive audio input such as voice commands and speech (e.g., including voice queries). For example, a user may speak letters or words that are received by the microphone and converted to text by control circuitry 404. In a further example, a user may voice commands that are received by the microphone and recognized by control circuitry 404.

In some embodiments, user device 400, user equipment system 401, or both may be used to implement an application for providing recommendations, managing collaborations, or performing other suitable actions. The application may be implemented using any suitable architecture. For example, a stand-alone application may be wholly implemented on each one of user device 400 and user equipment system 401. In some such embodiments, instructions for the application are stored locally (e.g., in storage 408), and data for use by the application is downloaded on a periodic basis (e.g., from an out-of-band feed, from an Internet resource, or using another suitable approach). Control circuitry 404 may retrieve instructions for the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected. The application and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and nonvolatile computer memory or storage devices such as a hard disk, floppy disk, USB drive, DVD, CD, media card, register memory, processor cache, Random Access Memory (RAM), etc.

In some embodiments, the application is a client/server-based application. Data for use by a thick or thin client implemented on each one of user device 400 and user equipment system 401 is retrieved on demand by issuing requests to a server remote from each one of user device 400 and user equipment system 401. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on user device 400. This way, the processing of the instructions is performed remotely by the server while the resulting displays, which may include text, a keyboard, or other visuals, are provided locally on user device 400. User device 400 may receive inputs from the user via input interface 410 and transmit those inputs to the remote server for processing and generating the corresponding displays. For example, user device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to user device 400 for presentation to the user.

In some embodiments, the application is downloaded and interpreted or otherwise run by an interpreter or virtual machine (e.g., run by control circuitry 404). In some embodiments, the application may be encoded in the ETV Binary Interchange Format (EBIF), received by control circuitry 404 as part of a suitable feed, and interpreted by a user agent running on control circuitry 404. For example, the application may be an EBIF application. In some embodiments, the application may be defined by a series of JAVA-based files that are received and run by a local virtual machine or other suitable middleware executed by control circuitry 404.

Figure 5:
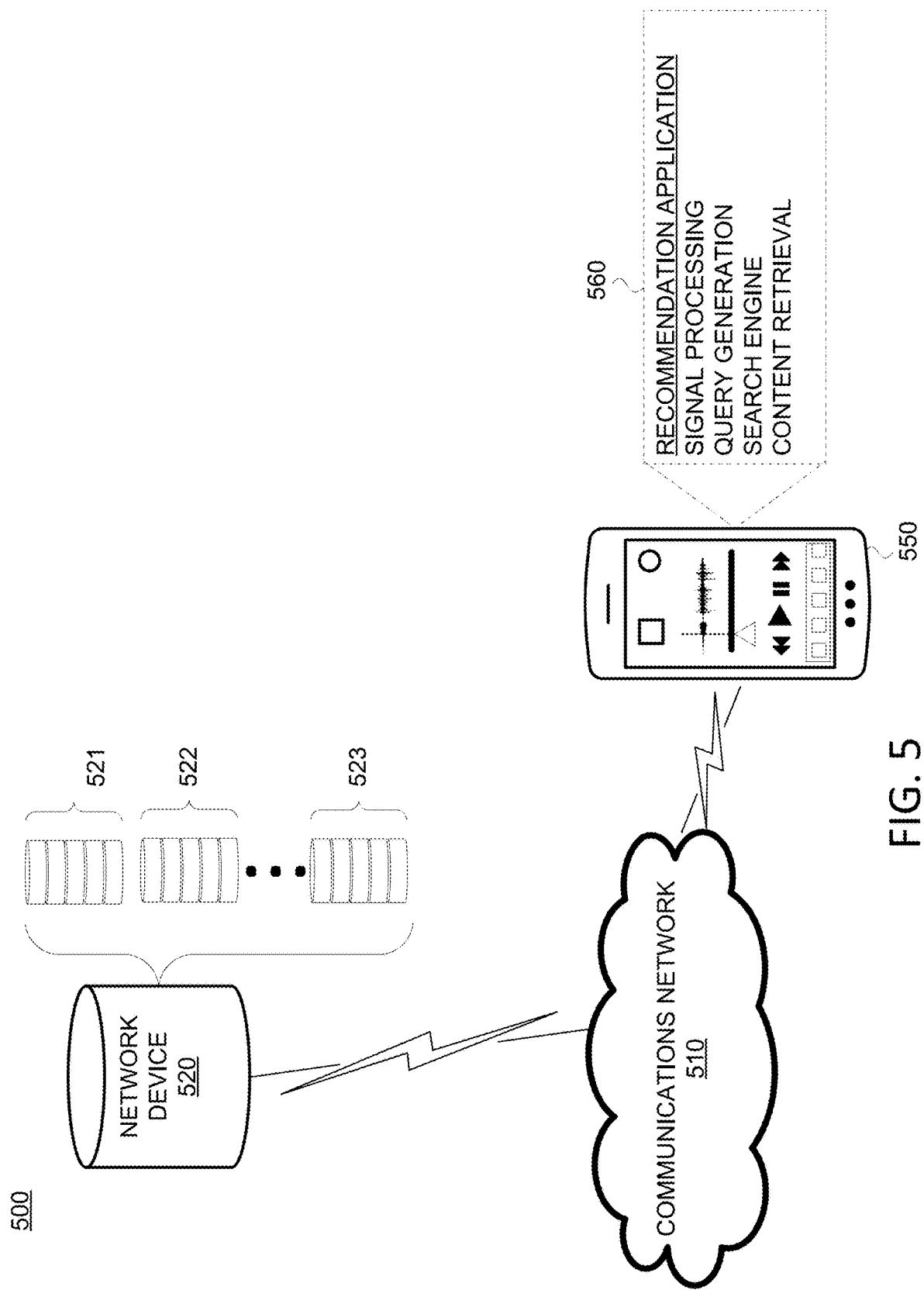
FIG. 5 is a block diagram of an illustrative system for providing recommendations, in accordance with some embodiments of the present disclosure.

FIG. 5 shows a block diagram of illustrative network arrangement 500 for providing recommendations, in accordance with some embodiments of the present disclosure. Illustrative system 500 may be representative of circumstances in which a user requests, views, listens to, browses among, creates, or otherwise interacts with content (e.g., original content, base content, collaborative content, or a combination thereof). In system 500, there may be more than one type of user device, but only one is shown in FIG. 5 to avoid overcomplicating the drawing. In addition, each user may utilize more than one type of user device and also more than one of each type of user device. User device 550 may be the same as user device 400 of FIG. 4, user equipment system 401, any other suitable device, or any combination thereof.

User device 550, illustrated as a wireless-enabled device, may be coupled to communications network 510 (e.g., connected to the Internet). For example, user device 550 is coupled to communications network 510 via a communications path (e.g., which may include an access point). In some embodiments, user device 550 may be a computing device coupled to communications network 510 via a wired connection. For example, user device 550 may also include wired connections to a LAN, or any other suitable communications link to network 510. Communications network 510 may be one or more networks including the Internet, a mobile phone network, mobile voice or data network (e.g., a 4G or LTE network), cable network, public switched telephone network, or other types of communications network or combinations of communications networks. Communications paths may include one or more communications paths, such as a satellite path, a fiber-optic path, a cable path, a path that supports Internet communications, free-space connections (e.g., for broadcast or other wireless signals), or any other suitable wired or wireless communications path or combination of such paths. Although communications paths are not drawn between user device 550 and network device 520, these devices may communicate directly with each other via communications paths, such as those described above, as well as other short-range point-to-point communications paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. Devices may also communicate with each other directly through an indirect path via communications network 510.

System 500, as illustrated, includes network device 520 (e.g., a server or other suitable computing device) coupled to communications network 510 via a suitable communications path. Communications between network device 520 and user device 550 may be exchanged over one or more communications paths but are shown as a single path in FIG. 5 to avoid overcomplicating the drawing. Network device 520 may include a database (e.g., a recommendation database or any other suitable database), one or more applications (e.g., as an application server, host server). A plurality of network entities may exist and be in communication with network 510, but only one is shown in FIG. 5 to avoid overcomplicating the drawing. In some embodiments, network device 520 may include one source device. In some embodiments, network device 520 implements an application that communicates with instances of applications at many user devices (e.g., each one similar to user device 550). For example, an instance of a social media application may be implemented on user device 550, with application information being communicated to and from network device 520, which may store profile information for the user (e.g., so that a current social media feed is available on other devices than user device 550). In a further example, an instance of a collaboration application may be implemented on user device 550, with application information being communication to and from network device 520, which may store profile information for the user, search histories from a plurality of users, entity information (e.g., content and metadata), tools for generating base content and collaborative content, any other suitable information, or any combination thereof.

In some embodiments, network device 520 includes one or more types of stored information, including, for example, entity information, metadata, content, historical communications and search records, user preferences, user profile information, any other suitable information, or any combination thereof. Network device 520 may include an applications-hosting database or server, plug-ins, a software developers kit (SDK), an applications programming interface (API), or other software tools configured to provide software (e.g., as downloaded to a user device), run software remotely (e.g., hosting applications accessed by user devices), or otherwise provide applications support to applications of user device 550. In some embodiments, information from network device 520 is provided to user device 550 using a client/server approach. For example, user device 550 may pull information from a server, or a server may push information to user device 550. In some embodiments, an application client residing on user device 550 may initiate sessions with network device 520 to obtain information when needed (e.g., when data is out-of-date or when a user device receives a request from the user to receive data). In some embodiments, information may include user information (e.g., user profile information, user-created content). For example, the user information may include current and/or historical user activity information such as what content transactions the user engages in, searches the user has performed, content the user has consumed/created, whether the user interacts with a social network, any other suitable information, or any combination thereof. In some embodiments, the user information may identify patterns of a given user for a period of time. As illustrated, network device 520 includes entity information for a plurality of entities. Entity information 521, 522, and 523 include metadata for the respective entities. Entities for which metadata is stored in network device 520 may be linked to each other, may be referenced to each other, may be described by one or more tags in metadata, or a combination thereof.

In some embodiments, an application may be implemented on user device 550, network device 520, or both. For example, the application may be implemented as software or a set of executable instructions, which may be stored in storage of the user device 550, network device 520, or both and executed by control circuitry of the respective devices. In some embodiments, a collaboration application may include a search application, a review application, a content analysis application, a content creation application, a content modification application, or a combination thereof, that is implemented as a client/server-based application, where only a client application resides on user device 550, and a server application resides on a remote server (e.g., network device 520). For example, an application may be implemented partially as a client application on user device 550 (e.g., by control circuitry of user device 550) and partially on a remote server as a server application running on control circuitry of the remote server (e.g., control circuitry of network device 520). When executed by control circuitry of the remote server, the application may instruct the control circuitry to generate a display and transmit the generated display to user device 550. The server application may instruct the control circuitry of the remote device to transmit data for storage on user device 550. The client application may instruct control circuitry of the receiving user device to generate the application displays.

In some embodiments, the arrangement of system 500 is a cloud-based arrangement. The cloud provides access to services, such as information storage, searching, messaging, or social networking services, among other examples, as well as access to any content described above, for user devices. Services can be provided in the cloud through cloud-computing service providers, or through other providers of online services. For example, the cloud-based services can include a storage service, a sharing site, a social networking site, a search engine, or other services via which user-sourced content is distributed for viewing by others on connected devices. These cloud-based services may allow a user device to store information to the cloud and to receive information from the cloud rather than storing information locally and accessing locally stored information. Cloud resources may be accessed by a user device using, for example, a web browser, a messaging application, a social media application, a content interaction application, a desktop application, or a mobile application, and may include an audio recording application, a speech-to-text application, a text-to-speech application, a voice-recognition application and/or any combination of access applications of the same. User device 550 may be a cloud client that relies on cloud computing for application delivery, or user device 550 may have some functionality without access to cloud resources. For example, some applications running on user device 550 may be cloud applications (e.g., applications delivered as a service over the Internet), while other applications may be stored and run on user device 550. In some embodiments, user device 550 may receive information from multiple cloud resources simultaneously.

Figure 6:
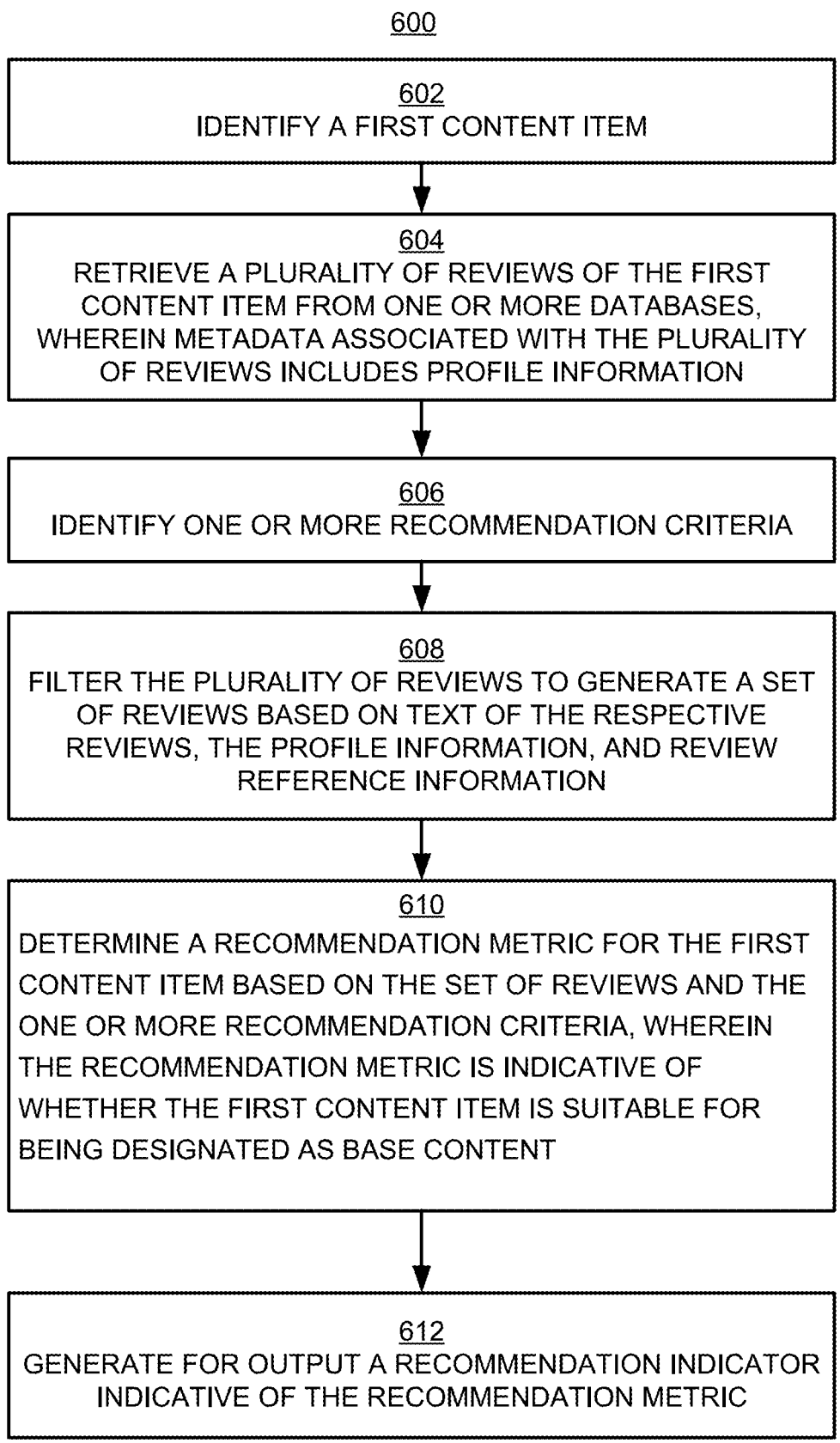
FIG. 6 is a flowchart of an illustrative process for generating a recommendation of original content, in accordance with some embodiments of the present disclosure.
Figure 7:
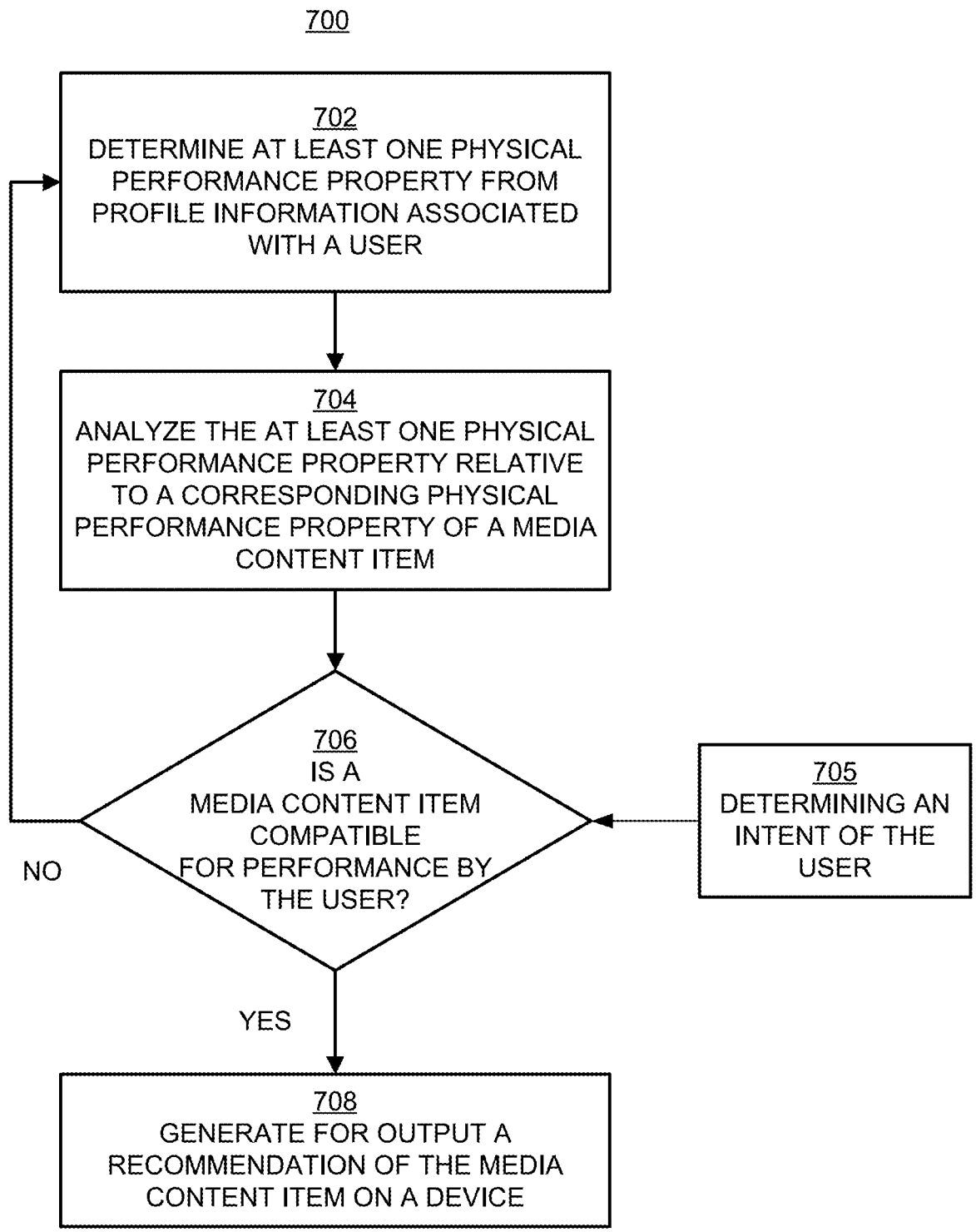
FIG. 7 is a flowchart of an illustrative process for generating a recommendation of a media content item, in accordance with some embodiments of the present disclosure.
Figure 8:
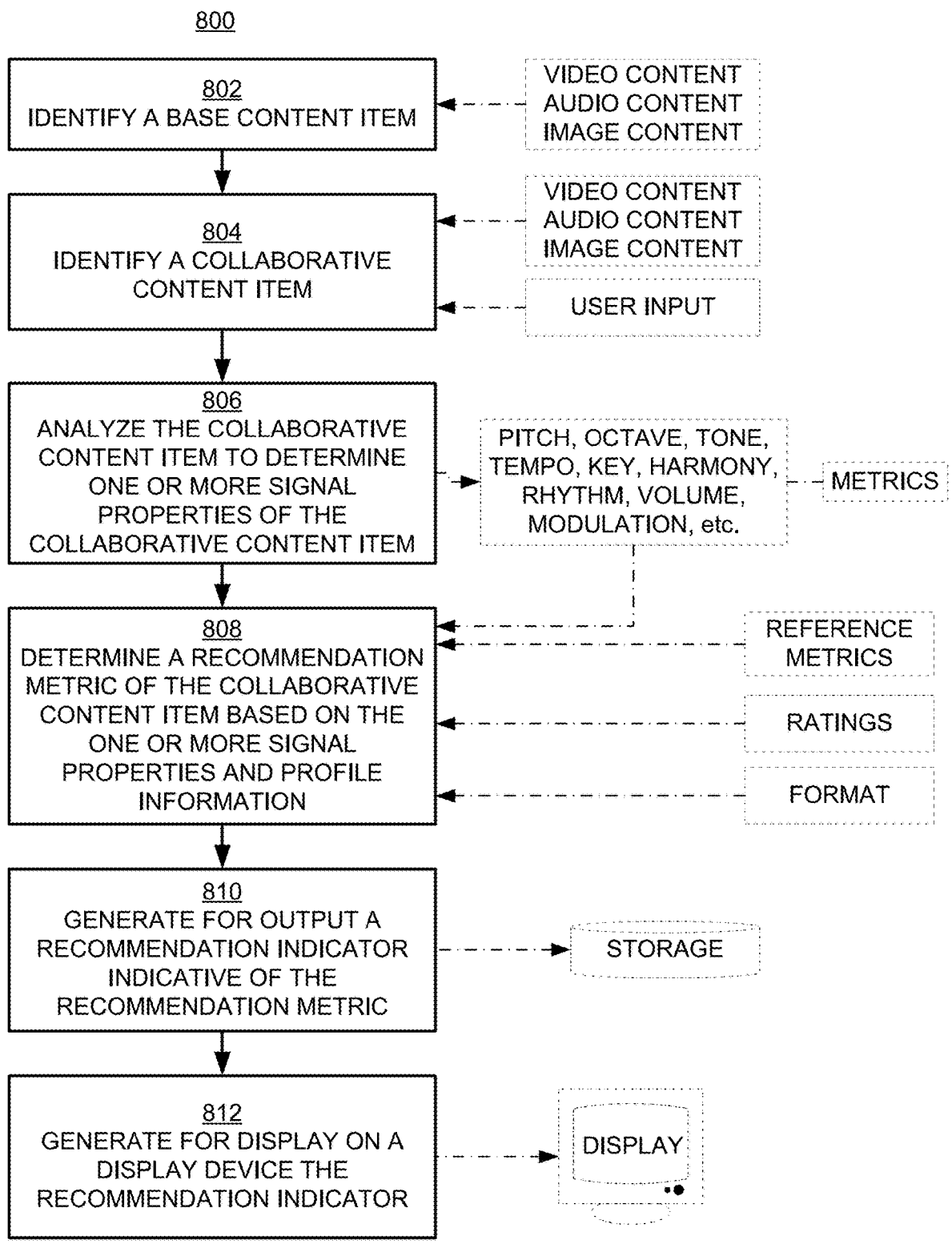
FIG. 8 is a flowchart of an illustrative process for generating a recommendation of collaborative content, in accordance with some embodiments of the present disclosure.

FIGS. 6-8 include flowcharts of processes for providing recommendations. The illustrative process will be described in the context of a recommendation application, which may be implemented using any suitable combination of hardware (e.g., user device 400, user equipment system 401, network device 520, or user device 550) and software. For example, the recommendation application may include components and functionality of, or otherwise be similar to, recommendation engines 120, 220, and 320 of respective FIGS. 1-3.

FIG. 6 is a flowchart of illustrative process 600 for generating a recommendation of original content, in accordance with some embodiments of the present disclosure. For example, a recommendation application may perform process 600, implemented on any suitable hardware such as user device 400 of FIG. 4, user equipment system 401 of FIG. 4, user device 550 of FIG. 5, network device 520 of FIG. 5, any other suitable device, or any combination thereof. In a further example, recommendation engine 120 of FIG. 1 may perform some or all steps of process 600. The recommendation application generates a recommendation of content for collaboration. For example, popular, viral, or trending media content items may be recommended for users to interact with (e.g., collaborate on). The recommendation application gathers comments associated with a content item, filters the comments to focus on relevant reviews, and then determines if and how strongly to recommend the content item. Original content items may include songs, videos (e.g., with both graphics and audio), images, or any other content intended as finished content. Original content may include previously uncollaborated-upon content, collaborative content, content modified from an original form, any other suitable content, or any combination thereof.

At step 602, the recommendation application identifies a first content item. In some embodiments, the first content item includes an original content item. For example, the first content item may include a movie, a movie clip (e.g., a scene or trailer), a song (e.g., from an album, soundtrack, or streaming service), a song clip (e.g., a verse or section of instrumental), a musical composition (e.g., a symphony), sound effects, a digital photograph, a graphic, any other suitable content, or any combination thereof. In some embodiments, the recommendation application receives (e.g., at a user interface) a user input indicating or indicative of the original content. For example, the recommendation application may identify the original content based on the user input (e.g., the user keys in an identifier or selects an option). In some embodiments, the recommendation application identifies the original content from among a plurality of original content items.

At step 604, the recommendation application retrieves a plurality of reviews from one or more databases. In some embodiments, the plurality of reviews are associated with the first content item. In some embodiments, metadata associated with the plurality of reviews includes profile information associated with each review. For example, the metadata may include reviewer information (e.g., about a user or entity that created the review), hashtags (e.g., or other tags that include keywords), reactions to and interactions with the review, a time and date of the review, a forum in which the review is posted, a rating (e.g., of the review or the reviewer), a ranking (e.g., of the review or the reviewer), any other suitable information, or any combination thereof. Reviews may include substantive comments, user recommendations, observances, or other user-generated commentary.

In some embodiments, the recommendation application performs step 604 before step 602. For example, in some embodiments, the recommendation application identifies the original content from among a plurality of original content, based on retrieved reviews. In a further example, the recommendation application may retrieve a plurality of reviews from a plurality of sources or forums, and identify the original content by identifying references to the original content among the reviews. Identifying the first content item based on reviews allows, for example, the recommendation application to identify content for which there is existing feedback.

At step 606, the recommendation application identifies one or more recommendation criteria. In some embodiments, for example, the recommendation criteria may be retrieved from a database (e.g., reference information 150 of FIG. 1) by the recommendation application. Recommendation criteria may include, for example, signal properties identified as recommendation categories, positive or negative review tone, reviewer requirements (e.g., minimum ranking, rating, number of reviews that user has generated, or relevance of the reviewer), any other suitable criteria, or any combination thereof. In some embodiments, the recommendation criteria are predetermined and, for example, are stored as a list. In some embodiments, the recommendation criteria are selected based on metadata tags associated with the first content item, reviews, reviewers, base content creators, or a combination thereof. In some embodiments, the recommendation criteria may be based on the plurality of reviews. For example, if reviews include the term "pitch" or "harmony," the recommendation application may use these as recommendation categories. The recommendation application may select a category for a property based on the number of reviews referring to the property, which reviewer refers to the property, or whether the reviews are primarily positive or negative.

At step 608, the recommendation application filters the plurality of reviews to generate a set of reviews. The recommendation application may filter reviews based on text of the respective reviews, profile information associated with the respective reviewers, review reference information, any other suitable information, or any combination thereof. Filtering includes reducing the set of reviews under analysis based on criteria. For example, an original set of N reviews retrieved from suitable sources may be reduced to a set of M reviews, where N is an integer and where M is an integer less than N. To illustrate, the recommendation application may retrieve 1,000 user-generated comments from a media content provider, and filter these reviews to 20-30 that mention signal properties, include keywords, or have associated metadata tags that match reference tags.

In some embodiments, the recommendation application filters the reviews by comparing text of the reviews to one or more references to generate matches. For example, the references may include predetermined keywords or templates. The recommendation application identifies the set of reviews based on the matches. For example, reviews that include keywords such as "pitch," "tempo," "harmony," "better," "if only," "review," "opinion," "recommend," or any other suitable keywords or phrases may be retained while those not including the keywords may be regarded as non-review comments and need not be considered for generating a recommendation.

In some embodiments, the review reference information includes one or more reference tags. In some such embodiments, the recommendation application filters the reviews by identifying one or more respective metadata tags associated with each the plurality of reviews, comparing the one or more respective metadata tags to the reference tags. For example, reviews having metadata that includes tags such as "critique," "review," or any other suitable tags may be retained, while those for which the associated metadata does not include the keywords may be regarded as non-review comments and need not be considered for generating a recommendation.

At step 610, the recommendation application determines a recommendation metric for the first content item based on the set of reviews and based on the one or more recommendation criteria. The recommendation metric is indicative of whether the first content item is suitable for being designated as base content for generating collaborative content. The recommendation metric may include which properties to be changed from the first content item, whether and how strongly the first content item is recommended, or both.

In some embodiments, the recommendation application determines the recommendation metric for the first content item by identifying rating information of the set of reviews, wherein the rating information is indicative of users' responses to the first content item. For example, the rating information may include a binary rating (e.g., 0 or 1, good or bad, useful or not useful), a scored rating (e.g., 99%, 4 out of 5 stars, C–, any other score), a mapping (e.g., mapped with color, emojis, likes, symbols, or any other scale), a ranking (e.g., an index position in a sorted list, an index, a grouping), any other suitable rating or grading, or any combination thereof. For example, reviews that are more highly rated may be associated with stronger recommendation metrics.

In some embodiments, the recommendation application determines the recommendation metric for the first content item by identifying a number of reviews of the set of reviews that correspond to a first recommendation criterion. For example, the recommendation application may recommend a content item more strongly for use in a particular genre, or for users having particular profile information tags, especially if a large number of reviews are associated with those tags. In a further example, if a large number of reviews include text that indicates the content could benefit from a modification to pitch, tempo, or modulation, then the recommendation application can recommend the content to a base content creator for those modifications (e.g., by collaborators that may interact with the content).

In some embodiments, the recommendation application determines the recommendation metric for the first content item by identifying a number of interactions with each review of the set of reviews by one or more entities. For example, reviews that have more views, likes, replies, ratings, or otherwise are interacted with more, may be weighted more heavily in the recommendation metric. To illustrate, if a review stating a song could use a duet at a certain portion of the song has a large number of likes, views, or reviews, then the recommendation application may more strongly recommend that content as base content. In a further illustrative example, reviews having a large number of replies, regardless of positive or negative tone, may indicate popular content or opinions, which may in turn indicate content that is likely to be collaborated on (e.g., and is thus more strongly recommended).

In some embodiments, the recommendation application determines the recommendation metric for the first content item comprises determining a plurality of recommendation metrics, each associated with a respective recommendation criterion. For example, for a given content item, the recommendation metric may generate different recommendations for one or more signal properties, review categories, use cases (e.g., how the content is likely to be consumed or collaborated on), user types, user profile tags, for any other suitable category, or any combination thereof.

At step 612, the recommendation application generates for output a recommendation indicator indicative of the recommendation metric. In some embodiments, the recommendation application generates for output the recommendation indicator by generating for display (e.g., on a display device such as display 412) the recommendation indicator. For example, the recommendation application may generate for display on a display screen a list of content identifiers (e.g., corresponding to a plurality of content items including the first content item), graphics, selectable options, and suitable information, and display the recommendation indicator for one or more content identifiers (e.g., as illustrated in FIG. 1). In some embodiments, the recommendation application generates for output the recommendation indicator by storing the recommendation indicator in metadata associated with the first content item. For example, the recommendation application may generate one or more tags and store the tags in existing metadata associated with the content item. In a further example, the recommendation indicator may include a binary indicator (e.g., 0 or 1, yes or no), a scored indicator (e.g., 90%, 2 out of 5 stars, A+, any other score), a mapping (e.g., mapped with color, emojis, likes, symbols, or any other scale), a ranking (e.g., an index position in a sorted list, an index, a grouping), any other suitable rating or grading, or any combination thereof. In some embodiments, the recommendation indicator includes one or more tags of suggested modifications to the first content to create one or more versions of base content. For example, the recommendation indicator may include a tag indicating that the tempo of the first content item should be slowed. Accordingly, the base content creator can alter the tempo of the first content item to generate the base content. Further, a plurality of recommendation indicators may be generated, corresponding to a plurality of recommended modifications to the first content item to generate a plurality of corresponding base contents (e.g., each intended for differing audiences or collaborators).

FIG. 7 is a flowchart of illustrative process 700 for generating a recommendation of a media content item, in accordance with some embodiments of the present disclosure. For example, a recommendation application may perform process 700, implemented on any suitable hardware such as user device 400 of FIG. 4, user equipment system 401 of FIG. 4, user device 550 of FIG. 5, network device 520 of FIG. 5, any other suitable device, or any combination thereof. In a further example, recommendation engine 220 of FIG. 2 may perform some or all steps of process 700. In some embodiments, recommendations of media content items are based on physical performance properties that characterize a media content item and a user. Physical performance properties that characterize a user include, for example, octave, pitch, adenoidal behavior, tone, volume, accent, language, tempo, body movements, gestures, heart rate, body positions, body weight, body height, any suitable characteristic that describes an activity that can be performed, or any combination thereof. Physical performance properties that characterize a media content item include physical performance properties of users captured by an electronically consumable media content item and are not limited to what can be performed by a human, including digital modifications to what can be physically performed by a human (e.g., modulations for speech processing and filters for image and video processing). In some embodiments, the performance is recorded and stored in memory storage. Accordingly, the stored collaboration (e.g., the user's performance and the media content item) may be processed accordingly to any suitable process of the present disclosure (e.g., process 600 of FIG. 6, process 800 of FIG. 8, or both)

At step 702, the recommendation application determines at least one physical performance property from profile information associated with a user. In some embodiments, profile information includes information that the system uses to determine at least one physical performance property. For example, profile information may include a list of audio files associated with the user's voice (e.g., audio recordings of the user singing) and a list of video files associated with the user's movements (e.g., videos of the user dancing). The audio and video files may be associated with or stored in the user's profile for the recommendation application to process. In some embodiments, the physical performance properties of the user's voice and movements are determined by analyzing these files. Analysis may include, for example, frequency analysis (e.g., determining frequencies or octave ranges the user's voice can reach), movement pattern recognition (e.g., recognizing that the user is performing a head spin), any suitable digital signal processing of audio or video to determine a physical performance property, or any combination thereof. In some embodiments, the profile information includes records of physical performance properties that are used to determine additional physical performance properties. For example, profile information may include the user's height, weight, and body measurements (e.g., waist measurement) that are then used by the system to determine additional physical performance properties like body mass index. In some embodiments, the system determines the at least one physical performance property by receiving the physical performance property from a third-party source. For example, the system is communicatively coupled to an Internet of Things (IoT) wearable item that monitors heart rate, and a user's heart rate is received by the system to be associated with the user profile information as a physical performance property.

At step 704, the recommendation application compares at least one physical performance property (e.g., from step 702) to a corresponding physical performance property of a media content item. To illustrate, the recommendation application compares the user's performance to that of the media content item. In some embodiments, the system analyzes at least one physical performance property determined from profile information relative to a corresponding physical performance property of each of the plurality of media content items, wherein the profile information is associated with the user. The recommendation application may compare a physical performance property determined at step 702 to a corresponding physical performance property of a media content item. In some embodiments, the comparison produces an indication of compatibility. In some embodiments, the indication of compatibility reflects an exact match. For example, body movements determined in step 702 that the user's profile information reflects as movements the user is capable of match to the body movements required of the choreography of a dance routine. In some embodiments, the indication of compatibility reflects a degree or likelihood of matching. For example, the octave range determined in step 702, which the profile information indicates are musical notes that the user can sing, match 46 of the 50 musical notes that a song requires of its performer. In some embodiments, the comparison of the at least one physical performance property to a corresponding physical performance property of a media content item includes determining the frequencies at which a physical performance property is associated with the profile information. For example, for a figure skater whose recorded movement includes more instances of salchows than axels, the recommendation application maintains, as a part of the profile information, the frequency of each figure skating jump type, each of which is considered a physical performance property (e.g., the skating routine is characterized by physical performance properties such as a triple axel), to determine that the salchow is more frequently associated with the user profile than the axel. In some embodiments, the system uses the frequencies at which a physical performance property is exhibited in the profile information to determine, at step 706, whether the media content item is compatible for performance.

At step 705, the recommendation application determines an intent of the user. For example, intent may be determined based on previous behavior, user input, how the input is provided, any other suitable criteria, or any combination thereof. In a further example, the recommendation application may include or apply any suitable functionality of recommendation engine 220 of FIG. 2, for example. In some embodiments, the recommendation application determines that the user has an intention to perform, create content or both based on how the user accesses the recommendation application (e.g., using a shortcut on a user device). In some embodiments, a link may be shared with the user (e.g., by another user), and the recommendation application determines that because the link is to join someone else to perform, the intention is to perform. In some embodiments, the recommendation application identifies that a link is provided for consuming content, and accordingly determines that the intention is to consume and not perform (e.g., to listen but not sing). In some embodiments, the recommendation application may identify user behavior and determine an intent based on the behavior. For example, the recommendation application may determine by default that a content is to be consumed (e.g., unless specific instructions are provided, or particular devices are connected). In a further example, the recommendation application may determine an intent based on user location, based on a connected device, or based on other suitable criteria. In some embodiments, the recommendation application uses this determination for identifying which content to recommend for consumption, collaboration, performance, or a combination thereof.

At step 706, the recommendation application determines whether the media content item is compatible for performance by the user. In some embodiments, the recommendation application identifies the media content item as being compatible for performance by the user. The recommendation application may implement a predetermined threshold when determining whether the indication of compatibility confirms that a media content item is compatible for performance by the user. For example, a predetermined threshold for musical notes may be that "at least 90% of the musical notes required in a song must be within the user's singing abilities" for the song to be determined as compatible for the user to perform. In the illustrative example of 46 musical notes out of 50 total musical notes matching the user's singing capabilities, the predetermined threshold is satisfied, and the system accordingly determines that song is compatible for the user to perform. If the system determines that the media content item is not compatible for performance by the user, the system may return to step 702 (e.g., to restart the process of determining physical performance properties from the profile information). For example, in some embodiments, if new information defining the physical performance of a user is stored or associated with the user profile since the last time the recommendation application has performed step 702, the recommendation application performs steps 702 through 706 using the new information. If the recommendation application determines that the media content item is compatible for performance by the user, the system proceeds to step 708. In some embodiments, the system assigns a weight to each of the at least one physical performance properties and calculates a compatibility value to determine compatibility for performance by the user. For example, the system assigns a larger weight to a physical performance property representing the salchow movement than to a physical performance property representing the axel movement because the salchow movement physical performance property is more frequently associated with the user profile information than the axel movement physical performance property.

At step 708, the recommendation application generates for output a recommendation indicator of the media content item on a device. In some embodiments, the system presents a recommendation indicator or notification of the media content item that has been determined to be compatible for the user to perform. For example, in some embodiments, a dialogue box is displayed having a description of a song and a selectable soft button that, upon selection, allows the user to access the song. In some embodiments, the system generates for output an invitation to access the recommended media content item. In an illustrative example, the system sends an invitation to a user (e.g., by message, SMS, email, or other notification) to play the base content of the compatible song for performance in a karaoke environment.

In an illustrative example, the recommendation application recommends a song to a singer. The singer's recorded songs (e.g., audio files) are analyzed by the system. The system determines the physical performance properties of octave range and tempo by processing the audio files (e.g., taking a fast Fourier transform of the digitized signal to determine the frequency response or using a series of comb filters to determine the tempo of the audio file). In this illustrative example, the recommendation application determines that the singer has an octave range from C3 to G5 and sings at a tempo of approximately 100 bpm (e.g., average tempo of all audio files of the user singing). The recommendation application compares the determined physical performance properties with the corresponding physical performance properties of each song in a library of songs. Based on the comparison, the recommendation application determines, in this example, compatible songs as having only notes within the singer's octave range and a tempo equivalent or slower than the average tempo. To illustrate, the recommendation application may be less likely to recommend Mariah Carey's "Emotions" and more likely recommend Adele's "Hello" based on the octave range physical performance property and tempo physical performance property of the two songs for that singer.

In a further illustrative example, the system recommends a dance routine to a dancer. Konami Corporation's video game Dance Dance Revolution contains a library of gaming levels where each level corresponds to a unique pattern of dance moves required to complete the level. A user's progress consuming the media content item of Dance Dance Revolution may be associated with their profile information, which is accessible by the recommendation application (e.g., to recommend certain gaming levels of Dance Dance Revolution). The recorded dance movements of the user (e.g., video files) and content consumption history (e.g., levels completed and respective scores achieved) are analyzed by the recommendation application. The recommendation application determines, for example, the physical performance properties of tempo and cross step frequency based on profile information. The recommendation application compares the determined physical performance properties associated with the user profile information to the physical performance properties associated with the physical performance properties of each level of Dance Dance Revolution. The recommendation application recommends a level that matches the user's average cross step frequency and the average tempo to which the user dances.

In a further illustrative example, the recommendation application recommends an exercise type to an athlete. In some embodiments, the recommendation application analyzes physical performance properties of average heart rate during exercise, body weight, body height, and age that are determined from the athlete's profile information. The physical performance properties of various exercises such as, for example, swimming, weight lifting, and interval training are compared to the physical performance properties determined from the profile information associated with the athlete. To illustrate, the recommendation application may identify swimming as an exercise that is compatible for the user's average heart rate during exercise and current state of physical fitness determined from age, height, and weight. The system provides a recommendation to the athlete on the athlete's mobile device (e.g., a smartphone), for example.

Process 700, which is applicable to a single user, may be applied to a second user (e.g., or multiple users) such that the media content item recommended is compatible for both users (e.g., or a group of users) based on respective profile information. For example, the recommendation application recommends the same song to two singers to sing together based on an analysis of the octave range of the song and the singers' octave ranges. The system may determine a duet is compatible for two singers and recommend the duet to them, for which certain parts of the song are compatible for the first singer's physical performance properties and other parts of the song are compatible for the second singer's physical performance properties. For example, "Endless Love" by Diana Ross and Lionel Richie is recommended to two singers because the octave range physical performance properties of the two singers match with the octave range physical performance properties of Ross and Richie, respectively. In some embodiments, the system generates recommendations of portions of the recommended media content item, where each recommended portion is designated for the user that the portion is compatible with. For example, the system recommends only Ross's portions of "Endless Love" to a first of two singers and recommends only Richie's portions of the song to the second of the two singers. In some embodiments, the system generates for output recommendations to the users' devices separately (e.g., a first recommendation to a first device and a second recommendation to a second device) according to the portions of the media content item determined to be compatible with the user profiles' respective physical performance properties. For example, the recommendation application sends the recommended Ross portions of "Endless Love" to the first singer's smartphone and sends the recommended Richie portions of the song to the second singer's smartphone. Similar recommendations can be made for group dances (e.g., a group dance routine featuring styles of hip hop, break dancing, and waacking) and group exercises (e.g., swimming medley relays). In some embodiments, content recommendations generated by process 600 of FIG. 6 may include tags specifying compatible or preferred profile information (e.g., which properties a user exhibits that may be compatible with a given base content item).

In some embodiments, the recommendation application analyzes content item consumption history associated with the profile information to identify a media content item to recommend. For example, the recommendation application analyzes a list of songs with which a user has previously performed karaoke, identifies a song among the previously performed songs that is compatible with the at least one physical performance property, and recommends the song. In some embodiments, the system receives the user's content item consumption history associated with the profile information from a third-party application. For example, the list of songs that the user has previously performed karaoke with is maintained by the mobile application Smule.

FIG. 8 is a flowchart of illustrative process 800 for generating a recommendation of collaborative content, in accordance with some embodiments of the present disclosure. For example, a recommendation application may perform process 800, implemented on any suitable hardware such as user device 400 of FIG. 4, user equipment system 401 of FIG. 4, user device 550 of FIG. 5, network device 520 of FIG. 5, any other suitable device, or any combination thereof. In a further example, recommendation engine 320 of FIG. 3 may perform some or all steps of process 800. In some embodiments, collaborative content may be generated using process 700 of FIG. 7, wherein the performance is recorded and digitally stored (e.g., as a video, audio, or image file).

At step 802, the recommendation application identifies a base content item. The base content may include video content (e.g., a sequence of images, an animation, cinema), audio content (e.g., a song, an instrumental, speech, sound effects), image content (e.g., digital photos, animations, graphics, slides, digitized drawings), any other suitable content, or any combination thereof. In some circumstances, content may include video content and audio content (e.g., a music video). In some circumstances, video content may include image content such as a sequence of images, each identifiable and suitable for analysis.

At step 804, the recommendation application identifies a collaborative content item. The collaborative content may include video content, audio content, image content, any other suitable content, or any combination thereof. The collaborative content includes both the base content and additional content combined with the base content. In some embodiments, profile information is associated with the collaborative content. For example, the profile information may include information associated with a content creator, the content itself, or a combination thereof. In some embodiments, the recommendation application receives (e.g., at a user interface) a user input indicating or indicative of the collaborative content. For example, the recommendation application may identify the collaborative content based on the user input (e.g., the user keys in an identifier or selects an option).

At step 806, the recommendation application analyzes collaborative content to determine one or more signal properties of the collaborative content. In some embodiments, for which the collaborative content includes collaborative audio content, signal properties may include, for example, pitch, octave, tone, tempo, key, harmony, rhythm, volume, modulation, any other suitable property, or any combination thereof. Signal properties include, for example, properties that can be determined based on a signal that includes the content data. For example, by analyzing properties of the signal, aspects of the signal can be characterized, qualified, or quantified.

At step 808, the recommendation application determines a recommendation metric of the collaborative content based at least in part on the one or more signal properties and based at least in part on profile information.

In some embodiments, the recommendation application analyzes the collaborative content to determine one or more metrics corresponding to the one or more signal properties. In some such embodiments, the recommendation application compares one or more determined metrics to the one or more reference metrics to generate the recommendation metric.

In an illustrative example, for audio content, the recommendation application may determine a pitch metric (e.g., scored on how high or low one or more notes is), octave (e.g., scored on which octave(s) the content lies in), tone (e.g., scored on how steady the tone is), tempo (e.g., scored on the speed or feature timing), key (e.g., scored on comparison with a reference or benchmarks), harmony (e.g., scored on phasing or relative time signatures of features), rhythm (e.g., scored on regularity and timing), volume (e.g., scored on volume level and range in volume), modulation (e.g., scored on timing, extent of modulation, modulation features compared to reference features), any other suitable metric, or any combination thereof.

In an illustrative example, for video content, the recommendation application may determine a color metric (e.g., scored on palette, color scale), brightness (e.g., scored on local or overall brightness), lighting (e.g., scored on directionality, diffusivity, specularity), motion (e.g., scored on the speed, timing, harmony, or extent of motion), accompanying audio (e.g., scored on any of the metrics discussed above), playback (e.g., scored on framerate, noise, distortion), any other suitable metric, or any combination thereof.

In an illustrative example, for image content, the recommendation application may determine a color metric (e.g., scored on palette, color scale), brightness (e.g., scored on local or overall brightness), lighting (e.g., scored on directionality, diffusivity, specularity), composition (e.g., scored on the arrangement of features), any other suitable metric, or any combination thereof.

In an illustrative example, the recommendation application may determine the recommendation metric of the collaborative content by analyzing the collaborative content to determine one or more metrics corresponding to the one or more signal properties, and then comparing the one or more metrics to one or more reference metrics. In some embodiments, the recommendation application determines the one or more reference metrics based on analyzing the corresponding one or more base signal properties of the base content. For example, the recommendation application may determine a pitch metric based on the collaboration content and a reference pitch metric based on the base content, and then compare the pitch metric to the reference pitch metric. The recommendation metric may be inversely proportional to a difference or variation between the metric and the reference metric. For example, the closer the signal property, or metric thereof, of the collaborative content is to the signal property, or metric thereof, of the base content, the stronger the recommendation metric (e.g., a larger numerical value and thus "more" recommended).

In a further illustrative example, the recommendation application may determine the recommendation metric of the collaborative content based on ratings. In some embodiments, the recommendation application determines a first rating associated with the base content and a second rating associated with the collaborative content. In some such embodiments, the recommendation application compares the first rating to the second rating to determine the recommendation metric. For example, if the first rating is high, then a high second rating will result in a greater recommendation metric and a low second rating will result in a lesser recommendation metric. Accordingly, the recommendation application may recommend collaborations that are rated similarly to the base content. In some embodiments, the first rating is a fixed constant or null, thus making the base content rating irrelevant for comparison. In some such embodiments, the recommendation application determines the recommendation metric based on the second rating alone.

In a further illustrative example, the recommendation application may determine the recommendation metric based on content formats. In some embodiments, the recommendation application determines a first format associated with the base content and a second format associated with the collaborative content. In some such embodiments, the recommendation application compares the first format and the second format to generate the recommendation metric. For example, if the base content includes video content with audio content (e.g., such as a music video), the recommendation application may recommend collaborative content that includes both video and audio content rather than one or the other. To illustrate, if the base content is a music video, then collaborative content that includes a video with no sound, or an audio track with no video, will have a lesser recommendation than a collaboration having both video and sound. In a further example, the recommendation application may recommend collaborative content having a similar file type or file format as the base content (e.g., both may be MPEGS, WAV files, or JPEG files).

In some embodiments, the recommendation application combines a plurality of recommendation metrics, each determined based on a particular criterion, to generate a resulting recommendation metric. For example, the recommendation application may use a sum, an average, a weighted sum, a weighted average, a product, any other operation or series of operations, or any combination thereof. For example, a plurality of recommendation metrics may be determined, each ranging from 0-1 (or each ranging in any other suitable interval), and the recommendation application may determine the product of the recommendation metrics as the resulting recommendation metric.

At step 810, the recommendation application generates for output a recommendation indicator indicative of the recommendation metric. In some embodiments, the recommendation application stores the recommendation indicator in metadata associated with the collaborative content. For example, the metadata may be stored in suitable memory storage of a network device or user device. In a further example, the recommendation application may generate a tag and store the tag as part of existing metadata. A recommendation indicator may include a binary indicator (e.g., 0 or 1, yes or no, highly recommended or minimally recommended), a scored indicator (e.g., 80%, 4 out of 5 stars, B+, any other score), a mapping (e.g., mapped with color, emojis, symbols, or any other scale), a ranking (e.g., an index position in a sorted list, an index, a grouping), any other suitable recommendation indicator, or any combination thereof. For example, for a highly recommended collaborative content item, the recommendation application may output a tag including the value, symbol identifier, grading, score, ranking, mapping, or other suitable tag.

At step 812, the recommendation application generates for display on a display device the recommendation indicator. In some embodiments, the recommendation application may generate for display a graphic corresponding to the recommendation indicator. For example, the recommendation application may generate for display on a display screen a list of content identifiers, graphics, selectable options, and suitable information, and display the recommendation indicator for one or more content identifiers (e.g., as illustrated in FIG. 3). In some embodiments, steps 810 and 812 may be combined, or either may be omitted, in accordance with the present disclosure. For example, the recommendation application may generate for display the recommendation indicator, and otherwise need not output to storage. In a further example, the recommendation application may store the recommendation indicator, but the indicator is not displayed.

It is contemplated that the steps or descriptions of FIGS. 6-8 may be used with any other embodiment of this disclosure. In addition, the steps and descriptions described in relation to FIGS. 6-8 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the respective processes. Furthermore, it should be noted that any of the devices or equipment discussed in relation to FIGS. 4-5, a suitable network entity (e.g., a server), a suitable user device (e.g., a smartphone), or a combination thereof, could be used to perform one or more of the steps in FIGS. 6-8. Furthermore, it should be noted that the features and limitations described in any one embodiment may be applied to any other embodiment herein, and flowcharts or examples relating to one embodiment may be combined with any other embodiment in a suitable manner, done in different orders, performed with addition steps, performed with omitted steps, or done in parallel. In addition, the systems and methods described herein may be performed in real time. It should also be noted that the systems and/or methods described above may be applied to, or used in accordance with, other systems and/or methods.

In an illustrative example, a recommendation application may identify original content and recommend that content to a base content creator (e.g., process 600), identify base content and recommend that base content to a user for interacting with or collaborating on (e.g., process 700), identify a collaboration and recommend that collaboration to one or more users for consumption (e.g., process 800), or a combination thereof.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method comprising:
   identifying a base content;
   identifying, using control circuitry, a plurality of collaborative content, wherein each collaborative content of the plurality of collaborative content comprises the base content modified by an additional content;
   determining, using the control circuitry, for each collaborative content of the plurality of collaborative content, a recommendation metric based at least in part on one or more signal properties of the collaborative content and based at least in part on profile information of the collaborative content;
   filtering, using the control circuitry, the plurality of collaborative content based on:
   1) the recommendation metrics of the plurality of collaborative content, and
   2) the profile information associated with each collaborative content of the plurality of collaborative content;
   generating a recommendation indicator based on the recommendation metrics and the profile information; and
   generating for output, using control circuitry, the recommendation indicator.

2. The method of claim 1, wherein the base content comprises base audio content, and wherein each collaborative content of the plurality of collaborative content comprises collaborative audio content.

3. The method of claim 1, wherein the base content comprises base video content, and wherein each collaborative content of the plurality of collaborative content comprises collaborative video content.

4. The method of claim 1, wherein determining the recommendation metric of each collaborative content of the plurality of collaborative content comprises, for each collaborative content:
   analyzing the collaborative content of the plurality of collaborative content to determine one or more metrics corresponding to the one or more signal properties of the collaborative content; and
   comparing the one or more metrics to a one or more reference metrics to generate the recommendation metric for the collaborative content.

5. The method of claim 4, further comprising determining the one or more reference metrics that correspond to the one or more base signal properties of the base content.

6. The method of claim 1, wherein determining the recommendation metric of each collaborative content of the plurality of collaborative content comprises, for each collaborative content:
   determining a first rating associated with the base content;
   determining a second rating associated with the collaborative content of the plurality of collaborative content; and
   comparing the first rating and the second rating to generate the recommendation metric for the collaborative content.

7. The method of claim 1, wherein determining the recommendation metric of each collaborative content of the plurality of collaborative content comprises, for each collaborative content:
   determining a first format associated with the base content;
   determining a second format associated with the collaborative content of the plurality of collaborative content; and
   comparing the first format and the second format to generate the recommendation metric for the collaborative content.

8. The method of claim 1, wherein the base content comprises base audio content, wherein each collaborative content of the plurality of collaborative content comprises collaborative audio content, and wherein the one or more signal properties comprise at least one selected from the group comprising pitch, octave, tone, tempo, key, harmony, rhythm, volume, and modulation.

9. The method of claim 1, further comprising receiving, at a user interface, a user input indicative of a first collaborative content of the plurality of collaborative content, wherein identifying the first collaborative content comprises identifying the first collaborative content based on the user input.

10. The method of claim 1, wherein generating for output the recommendation indicator comprises storing the recommendation indicator in metadata associated with each collaborative content of the plurality of collaborative content.

11. A system comprising:
   a display device; and
   control circuitry coupled to the display device, and configured to:
      identify a base content;
      identify, using control circuitry, a plurality of collaborative content, wherein each collaborative content of the plurality of collaborative content comprises the base content modified by an additional content;

determine, using the control circuitry, for each collaborative content of the plurality of collaborative content, a recommendation metric based at least in part on one or more signal properties of the collaborative content and based at least in part on profile information of the collaborative content;

filter, using the control circuitry, the plurality of collaborative content based on:
1) the recommendation metrics of the plurality of collaborative content, and
2) the profile information associated with each collaborative content of the plurality of collaborative content;

generate a recommendation indicator based on the recommendation metrics and the profile information; and generate for output, using control circuitry, the recommendation indicator.

12. The system of claim 11, wherein the base content comprises base audio content, and wherein each collaborative content of the plurality of collaborative content comprises collaborative audio content.

13. The system of claim 11, wherein the base content comprises base video content, and wherein each collaborative content of the plurality of collaborative content comprises collaborative video content.

14. The system of claim 11, wherein the control circuitry is further configured to determine the recommendation metric of each collaborative content of the plurality of collaborative content by, for each collaborative content:
analyzing the collaborative content of the plurality of collaborative content to determine one or more metrics corresponding to the one or more signal properties of the collaborative content; and
comparing the one or more metrics to a one or more reference metrics to generate the recommendation metric for the collaborative content.

15. The system of claim 14, wherein the control circuitry is further configured to determine the one or more reference metrics that correspond to the one or more base signal properties of the base content.

16. The system of claim 11, wherein the control circuitry is further configured to determine the recommendation metric of each collaborative content of the plurality of collaborative content by, for each collaborative content:
determining a first rating associated with the base content;
determining a second rating associated with the collaborative content of the plurality of collaborative content; and
comparing the first rating and the second rating to generate the recommendation metric for the collaborative content.

17. The system of claim 11, wherein the control circuitry is further configured to determine the recommendation metric of each collaborative content of the plurality of collaborative content by, for each collaborative content:
determining a first format associated with the base content;
determining a second format associated with the collaborative content of the plurality of collaborative content; and
comparing the first format and the second format to generate the recommendation metric for the collaborative content.

18. The system of claim 11, wherein the base content comprises base audio content, wherein each collaborative content of the plurality of collaborative content comprises collaborative audio content, and wherein the one or more signal properties comprise at least one selected from the group comprising pitch, octave, tone, tempo, key, harmony, rhythm, volume, and modulation.

19. The system of claim 11, further comprising a user interface coupled to the control circuitry and configured to receive user input, wherein the control circuitry is further configured to identify collaborative content of the plurality of collaborative content comprises identifying a first collaborative content based on the user input.

20. The system of claim 11, wherein the control circuitry is further configured to store the recommendation indicator in metadata associated with a first collaborative content of the plurality of collaborative content.

* * * * *